(12) United States Patent
Meijer et al.

(10) Patent No.: US 8,533,693 B2
(45) Date of Patent: Sep. 10, 2013

(54) EMBEDDING EXPRESSIONS IN XML LITERALS

(75) Inventors: Henricus Johannes Maria Meijer, Mercer Island, WA (US); David N. Schach, Redmond, WA (US); Avner Y. Aharoni, Seattle, WA (US); Peter F. Drayton, Redmond, WA (US); Brian C. Beckman, Newcastle, WA (US); Amanda Silver, Seattle, WA (US); Paul A. Vick, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 92 days.

(21) Appl. No.: 12/955,680

(22) Filed: Nov. 29, 2010

(65) Prior Publication Data

US 2011/0072413 A1 Mar. 24, 2011

Related U.S. Application Data

(63) Continuation of application No. 11/209,067, filed on Aug. 22, 2005, now Pat. No. 7,945,904.

(51) Int. Cl.
*G06F 9/45* (2006.01)
*G06F 9/44* (2006.01)

(52) U.S. Cl.
USPC ........... 717/140; 717/141; 717/142; 717/114; 717/115

(58) Field of Classification Search
USPC ................. 717/140, 141, 142, 143, 114, 115; 715/234
See application file for complete search history.

(56) References Cited

U.S. PATENT DOCUMENTS

| | | | |
|---|---|---|---|
| 5,923,880 A | 7/1999 | Rose et al. | |
| 6,578,192 B1 | 6/2003 | Boehme | |
| 6,671,853 B1 | 12/2003 | Burkett | |
| 6,754,884 B1 | 6/2004 | Lucas et al. | |
| 6,799,184 B2 | 9/2004 | Bhatt | |
| 6,918,107 B2 | 7/2005 | Lucas | |
| 6,925,631 B2 * | 8/2005 | Golden | 717/115 |

(Continued)

FOREIGN PATENT DOCUMENTS

WO WO02063438 8/2002

OTHER PUBLICATIONS

Obasanjo, Dare, Integrating XML into Popular Programming Languages, Jan. 13, 2005, 11 pages.

(Continued)

*Primary Examiner* — Qamrun Nahar
(74) *Attorney, Agent, or Firm* — Workman Nydegger

(57) ABSTRACT

An architecture that that extends conventional computer programming languages that compile into an instance of an extensible markup language (XML) document object model (DOM) to provide support for XML literals in the underlying programming language. This architecture facilitates a convenient short cut by replacing the complex explicit construction required by conventional systems to create an instance of a DOM with a concise XML literal for which conventional compilers can translate into the appropriate code. The architecture allows these XML literals to be embedded with expressions, statement blocks or namespaces to further enrich the power and versatility. In accordance therewith, context information describing the position and data types that an XML DOM can accept can be provided to the programmer via, for example, an integrated development environment. Additionally, the architecture supports escaping XML identifiers, a reification mechanism, and a conversion mechanism to convert between collections and singletons.

20 Claims, 13 Drawing Sheets

(56) References Cited

U.S. PATENT DOCUMENTS

| | | |
|---|---|---|
| 6,938,204 B1 | 8/2005 | Hind |
| 6,981,212 B1 | 12/2005 | Claussen |
| 7,096,455 B2 | 8/2006 | Santiago |
| 7,114,123 B2 | 9/2006 | Chen |
| 7,191,433 B2 | 3/2007 | Narad et al. |
| 7,210,138 B2 | 4/2007 | Zatloukal et al. |
| 7,266,766 B1 | 9/2007 | Claussen |
| 7,401,327 B2 | 7/2008 | Halstead et al. |
| 7,665,073 B2 | 2/2010 | Meijer |
| 2002/0026447 A1 | 2/2002 | Matsutsuka et al. |
| 2002/0095658 A1 | 7/2002 | Shulman et al. |
| 2002/0133812 A1 | 9/2002 | Little et al. |
| 2002/0184264 A1 | 12/2002 | Berg |
| 2003/0163603 A1 | 8/2003 | Fry |
| 2004/0117776 A1 | 6/2004 | Pazandak |
| 2004/0193575 A1 | 9/2004 | Chen |
| 2004/0194057 A1 | 9/2004 | Schulte |
| 2005/0216885 A1 | 9/2005 | Ireland |
| 2006/0074734 A1 | 4/2006 | Shukla et al. |
| 2006/0130128 A1 | 6/2006 | Gorancic et al. |
| 2008/0010629 A1 | 1/2008 | Berg |
| 2011/0314460 A1 | 12/2011 | Wischick |

OTHER PUBLICATIONS

Meijer, Erik; Shulte, Wolfram, Unifying Tables, Objects and Documents, Aug. 2003, 24 pages.

Li, et al. "Compiler Support for Efficient Processing of XML Datasets", 2003, ACM, p. 42-52.

Fu, et al. "Model Checking XML Manipulating Software", 2004, ACM, p. 252-262.

Lovett, et al. "SML End Tag- RE: </> as end tag", 1997, retrieved from online: http://www.stylusstudio.com/xmldev/199711/pos40000.html, p. 1-3.

U.S. Appl. No. 11/209,067, Sep. 29, 2008, Office Action.

U.S. Appl. No. 11/209,067, May 6, 2009, Office Action.

U.S. Appl. No. 11/209,067, Feb. 24, 2010, Office Action.

U.S. Appl. No. 11/209,067, Sep. 2, 2010, Notice of Allowance.

U.S. Appl. No. 11/209,067, Jan. 18, 2011, Notice of Allowance.

Notice of Allowance dated Feb. 21, 2013 cited in U.S. Appl. No. 12/819,404.

The flexible XML-based Languages (FXL) Project, "FXL Project-Introduction", 2006, Last Accessed Apr. 2010, 2 pages.

Kirkegaard, Christian, et al., "Static Analysis of XML Transformations in Java", IEE Transactions on Software Enginering, Mar. 2004, 16 pages.

Wildermuth, Shawn, MSDN, "Textual Domain Specific Languages for Developers- Part 1", Feb. 2009, 11 pages.

Reuter, Florian, et al., "STAX/bc: A binding compiler for event-based XML data binding APIs", Jan. 2004, 9 pages.

Vesselin, www.brics.dk "Static Validation of Dynamically Generated XML Documents", Based on information available and belief available, at least as early as Apr. 8, 2010.

Castor, "Using Castor XML", 2005, Last accessed Apr. 2010, 6 pages.

Doucet et al., Introspection in System-Level Languages Frameworks: Meta-level vs. Integrated, IEEE, Mar. 2003, pp. 1-6.

Maruyama et al., A CASE Tool Platform Using an XML Representation of Java Source Code, IEEE, Sep. 2004, pp. 1-10.

McRitchie et al., Managing Component Variability within Embedded Software Product Lines via Transformational Code Generation, Springer-Verlag Berlin Heidelberg Nov. 2003, pp. 98-100.

Office Action cited in U.S. Appl. No. 11/108,455 dated Oct. 30, 2008.

Office Action cited in U.S. Appl. No. 11/108,455 dated Jun. 8, 2009.

Notice of Allowance cited in U.S. Appl. No. 11/108,455 dated Oct. 13, 2009.

Notice of Allowance cited in U.S. Appl. No. 12/819,404 dated Dec. 11, 2012.

* cited by examiner

EMBEDDING EXPRESSIONS IN XML LITERALS

CROSS-REFERENCE TO RELATED APPLICATIONS

This application is a continuation of, and claims priority to and the benefit of, U.S. patent application Ser. No. 11/209,067 filed on Aug. 22, 2005 and entitled "EMBEDDING EXPRESSION IN XML LITERALS," which application is hereby expressly incorporated herein by this reference in its entirety.

BACKGROUND

Markup languages and applications associated therewith continue to evolve and become commonplace in today's computing environments. Generally, a markup language describes a set of labels that are embedded within text to distinguish groups of elements or individual elements for display or identification purposes. Typically, these labels are known as "tags".

Today, extensible markup language (XML) is known as an open standard for describing data. Oftentimes, XML is employed to define data elements with respect to XML documents and/or business-to-business documents. XML is similar in tag structure to Hypertext Markup Language (HTML). However, HTML defines how elements are to be displayed while XML defines the content of the elements.

As such, contrary to HTML which uses predefined tags, XML enables a developer of an XML document or fragment to define tags. Thus, virtually any data item can be identified using XML tags, which allows for richer content.

In addition, the standard method to allow an XML document to be created, accessed or modified is via a document object model (DOM). A standardized specification has been developed that defines the interfaces for the different objects comprising the DOM, but does not provide any specifics for how a DOM should be implemented. Therefore, a programming language that utilizes a DOM compliant with the standard will produce an instance of that DOM that is language-neutral and platform-independent, regardless of how the underlying language implements the model.

Accordingly, while XML provides for a very robust way of describing data and conventional DOMs insure that the resultant XML documents are compatible regardless of the implementation details, traditional methods employed by programmers to create or modify instances of a DOM are difficult and time consuming. For example, creating an instance of a particular DOM requires explicit construction via constructors, factories, and/or imperative update statements to be written by the developer in the underlying programming language. While this explicit construction is often complex, the resulting XML document is generally quite straightforward, but no conventional method exists to adequately simplify this process.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises a system and methodology that extends conventional programming languages (e.g., Visual Basic, Python, PHP, C#, Java, etc.) by allowing extensible markup language (XML) literals to be embedded in the programming languages. This extension of programming languages can provide for a handy shortcut to construct instances of some underlying document object model (DOM) without explicit construction. Rather, users can create the same instance by simply writing an XML literal directly. This XML literal can be translated to the appropriate code to create the required instance.

In another aspect, the XML literals can be made even more powerful by embedding expressions and statement blocks inside otherwise static XML literals in order to allow fragments to be computed at run-time. In accordance therewith, an XML literal can be even more useful in programming languages by allowing the XML literal to refer to information or logic that is defined within the program but outside of the XML literal. For example, dynamic information such as expressions, statement blocks, or namespaces can replace the static information of traditional XML literals. The claimed invention thereby allows a constant in the XML literal to be replaced by a variable in any syntactic position where a variable is allowed in the underlying DOM.

Aspects of the described innovation can enable names to be further broken down into their prefix and namespace Uniform Resource Identifiers (URIs), both of which can be expressions with a data type that is convertible to strings. In another aspect, the subject invention enables the reification of any declaration or compile-time concept for which there is a corresponding run-time representation available that the programmer can manipulate. For example, namespace declarations are static constructs that are only known internally by the compiler, just like normal identifiers and types. Accordingly, a mechanism can be employed to reify certain types and namespaces. In addition, this mechanism can be extended to include all compiler concepts for which there is a run-time representation available, such as for methods, assemblies, or the like.

In accordance with another aspect of the claimed invention, a general mechanism for escaping identifiers is provided. Adding XML literals to a programming language can imply the need to add XML element and attribute names as valid identifiers in the underlying language. However, this mechanism is useful outside the XML domain as well. For example, this mechanism can be particularly useful for dynamic languages where objects can represent data from a domain that supports different identifiers escaping than the programming language itself.

In still another aspect, the invention enables a flexible scheme to convert between collections and singletons and to index collections in order to provide random access to the elements of the collection whereas conventional systems only provide for sequential access. Oftentimes when XML literals have embedded expressions or statement blocks that return either a singleton or a collection of values, deconstructing XML values returns results that can be either singletons or collections. Accordingly, this flexible conversion scheme employs a rule set to determine the necessary conversions and/or indexes.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is

DETAILED DESCRIPTION

Figure 1:
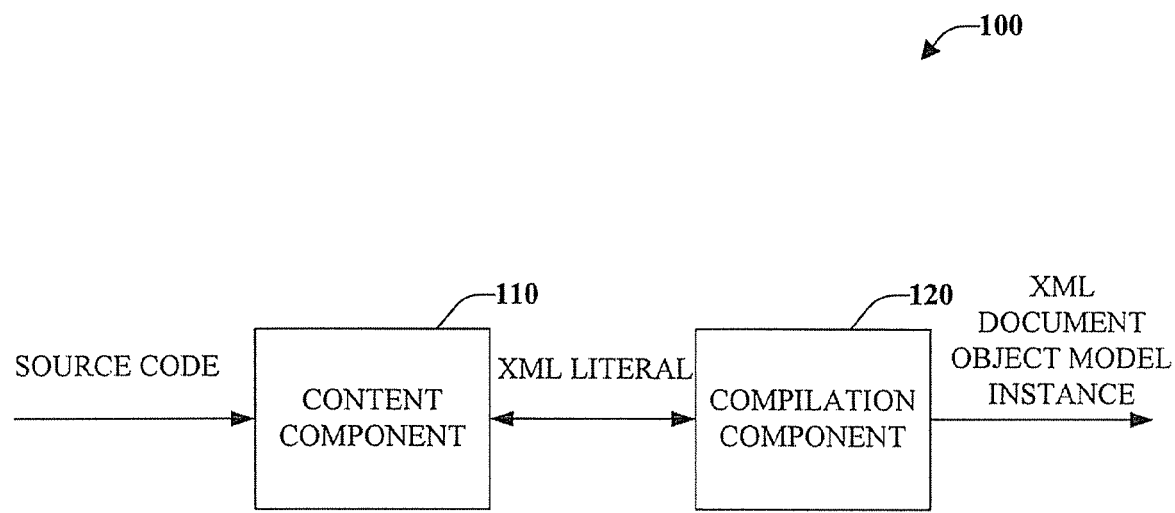
FIG. 1 illustrates a system that extracts an extensible markup language (XML) literal and creates an instance of the XML document object model (DOM) in accordance with an aspect of the invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

By extending conventional programming languages to include support for extensible markup language (XML) literals, instances of a particular XML document object model (DOM) can be created more easily and provide much greater flexibility. For example, instead of implementing the complicated construction statements traditionally used by programmers to create an instance of the DOM, the end result can be specified directly in the form of an XML literal. The compiler can then type-check, parse and translate the XML literal into code that will create the instance on the programmer's behalf.

Traditional XML literals by themselves are not very interesting because they are static in nature, similar to a constant. In order to make XML literals in programming languages even more useful or flexible, the subject invention enables expressions, statement blocks and namespaces to be embedded in the XML literal. In essence, data types such as expressions, namespaces or statement blocks can be inserted in any syntactic position where the target XML DOM allows those types.

In accordance therewith, extending conventional programming languages to support XML literals facilitates other aspects of the invention, which are described in more detail below. For example, aspects of the invention enable context information to be displayed to a programmer (e.g., via an integrated development environment (IDE)) indicating valid position and data types for the XML literal based upon the particular DOM that is being used. According to another aspect, the invention provides flexible and robust mechanism for type conversions between collections and singletons, as well as a novel procedure for indexing collections to provide random access to the individual elements, whereas conventionally only sequential access is provided.

In other aspects, certain redundancies can be eliminated from conventional XML tag parsing rules such as the need to match the element type name for the start-tag with an identical element type name for the end-tag. Furthermore, a mechanism for escaping identifiers (e.g., XML identifiers) to become valid identifiers in the underlying programming language is also provided, which facilitates escaping any set of characters as identifiers for any language, including programming languages that do not natively support XML. Moreover, the invention enables the declaration of XML namespaces and the reification of these XML namespaces as well as any compile-time concept for which there is a corresponding runtime representation available.

Referring initially to FIG. 1, an exemplary computer program compilation system 100 that compiles code for a computer programming language and creates an instance of an XML DOM is shown. Generally, the system 100 can include a content component 110 and a compilation component 120. The content component 110 can extract XML literals from the underlying programming language source code. The compilation component 120 can translate the XML literal to create an instance of the DOM utilized by the underlying programming language that includes the XML literal. In this manner, according to an embodiment of the subject invention, a convenient short cut can be provided to a programmer when creating the instance of the DOM. Instead of creating this instance through explicit construction via constructors, factories, and/or imperative update statements coded in the source code of the underlying programming language, the same instance can be created by simply writing an XML literal directly in the source code as it would appear in the instance of the DOM.

In particular, the compilation component 120 recognizes the XML literal extracted by the content component 110 and can then generate the appropriate code to create the required instance on behalf of the programmer Such an aspect is very convenient because creating an instance of a DOM using explicit construction is often a complex and time-consuming task. By way of example, consider the conventional way to create an XML document in memory using the XmlDocument application program interface (API). It is to be understood that the following code fragment is intended to be exemplary and, therefore, representative of any programming language that can be used to create an instance of a DOM and/or provides for an implementation of classes such as XmlDocument.

```
Sub Main( )
    Dim x As New Xml.XmlDocument
    Dim xe As XmlElement =
        x.CreateElement("foo", "http://foobar")
    x.AppendChild(xe)
    Dim xa as XmlAttribute = x.CreateAttribute("attr1")
    xa.Value = "I am an attribute"
    xe.Attributes.Append(xa)
    Dim bar As XmlElement =
        x.CreateElement("bar", "http://foobar")
    Dim text As XmlText = x.CreateTextNode("some content")
    bar.AppendChild(text)
    xe.AppendChild(bar)
    Console.WriteLine(x.InnerXml)
End Sub
```

This code generates a well-formed XML document depicted infra.

```
<foo attr1="I am an attribute" xmlns="http://foobar">
    <bar>some content</bar>
</foo>
```

However, in accordance with an aspect of the invention, by using XML literals, the complex, explicit construction required by a programming language to generate an instance of a DOM can be simplified by writing the end result directly in the underlying programming language as specified below.

```
Dim x As Xml.XmlDocument =
    <foo attr1="I am an attribute" xmlns="http://foobar">
        <bar>some content</bar>
    </foo>
```

As can be seen, the code normally required to create an XML document or fragment can be much more complex and difficult to read than the XML document or fragment itself. Therefore, by extending conventional programming languages to support XML literals, the compilation component 120 can be presented with an XML literal and then create the necessary code that generates the XML literal rather than merely relying solely upon explicit construction. It is to be understood that the descriptions and examples, supra, can apply to any XML DOM and to any programming language that compiles to an instance of an XML DOM. These additional aspects are to be considered within the scope of this disclosure and claims appended hereto.

Figure 2:
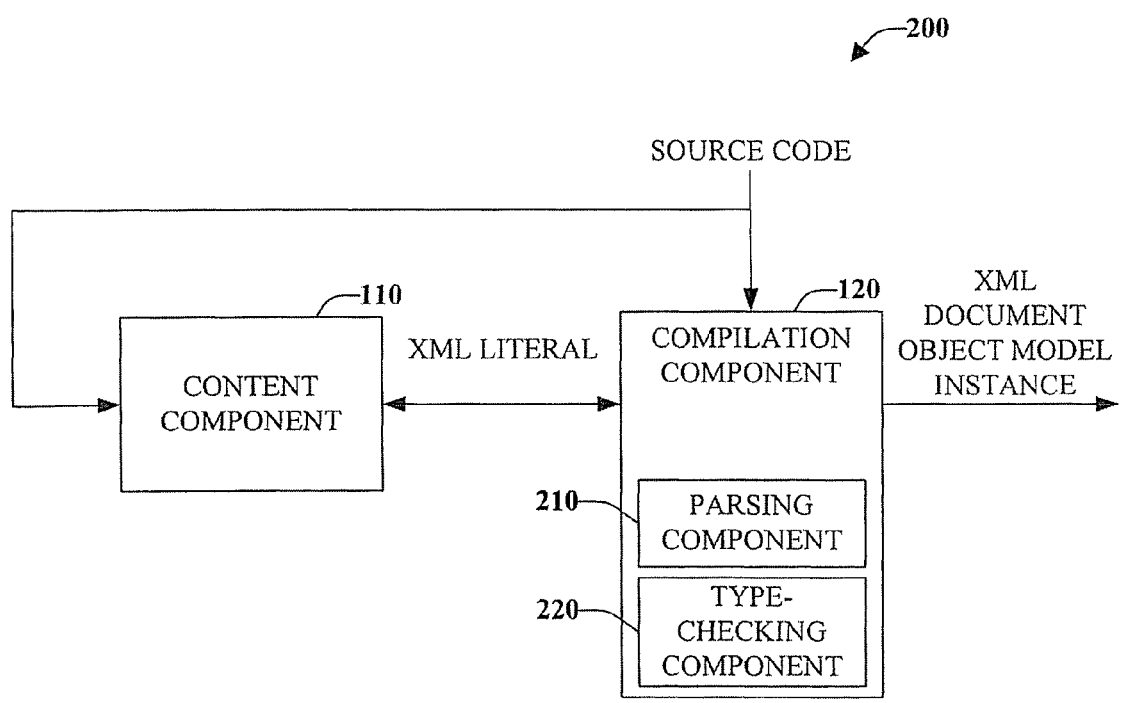
FIG. 2 illustrates a block diagram of the compilation system includes a parsing component and a type-checking component and compiles source code in accordance with an aspect of the invention.

Referring now to FIG. 2, a block diagram of an alternative computer program compilation system 200 in accordance with an aspect is shown. Generally, the system 200 includes a content component 110 that extracts XML literals from the source code, a compilation component 120 that translates the XML literal and compiles the source code to create an instance of an XML DOM. The compilation component 120 includes a parsing component 210 that parses the XML literal as well as the source code, and a type-checking component 220 that type-checks both the source code and the XML literal.

Typical XML parsers ensure that an XML document or fragment is "well-formed". Among the requirements to be well-formed, the XML tags must match, that is, the XML start-tag must be matched to the corresponding XML end-tag. Conventional XML tags comprise an element type name delimited by angle brackets (i.e., "<" and ">"), with the end-tag identical to the start-tag, but with the addition of a forward slash (i.e., "/") immediately following the opening angle bracket and before the element type name. XML allows these tags to be nested but requires parsing in Last-In-First-Out (LIFO) order to prevent ambiguous overlaps. Therefore, nested tags, in order to be well-formed and accepted by standard parsers, must appear as illustrated below.

```
<foo>
    <bar>some content</bar>
</foo>
```

As depicted, supra, the element type names that appear in the start-tag, in this case "foo" and "bar", must be repeated in the end-tag or convention parsers will generate an error. However, since tags are required to be in LIFO order, a parser does not need to have the element type name repeated in the end-tag to properly match the tags. Of course, in the case of a empty-tag the result is the same since empty-tags do not have an end-tag. Accordingly, in one embodiment the parsing component 210 does not allow the element type name to be repeated in the end-tag, such as in the example, infra.

```
<foo>
    <bar>some content</>
</>
```

Here, the parsing component 210 knows that the first end-tag (i.e., "</>") matches with the "<bar>" start-tag, and the second end-tag matches with the "<foo>" start-tag. In an alternative embodiment, the parsing component 210 allows the element type name to be repeated in the end-tag, but does not require doing so, effectively ignoring any data that follows the character indicating the tag is an end-tag, which in this case is the forward slash. These aspects can eliminate the redundancy of conventional parsers, and also allow for tags to contain data that is much more advanced and dynamic than the current standards contemplate. For example, expressions, namespaces and statement blocks can be embedded within XML literals to further enhance the functionality, as detailed below. If an expression is embedded that performs some computation, then this computation should not be repeated at the end-tag. Rather, a remark could be inserted after the "/" to provide context information or nothing at all. Therefore, the parsing component 210 can either ignore end-tag names or forbid them. Similarly, just as the parsing component 210 can extend the functionality of conventional parsers, the type-checking component 220 can extend the type-checking features of conventional type-checkers (e.g., to allow data types such as XML literals not natively supported by the underlying programming language).

Figure 3:
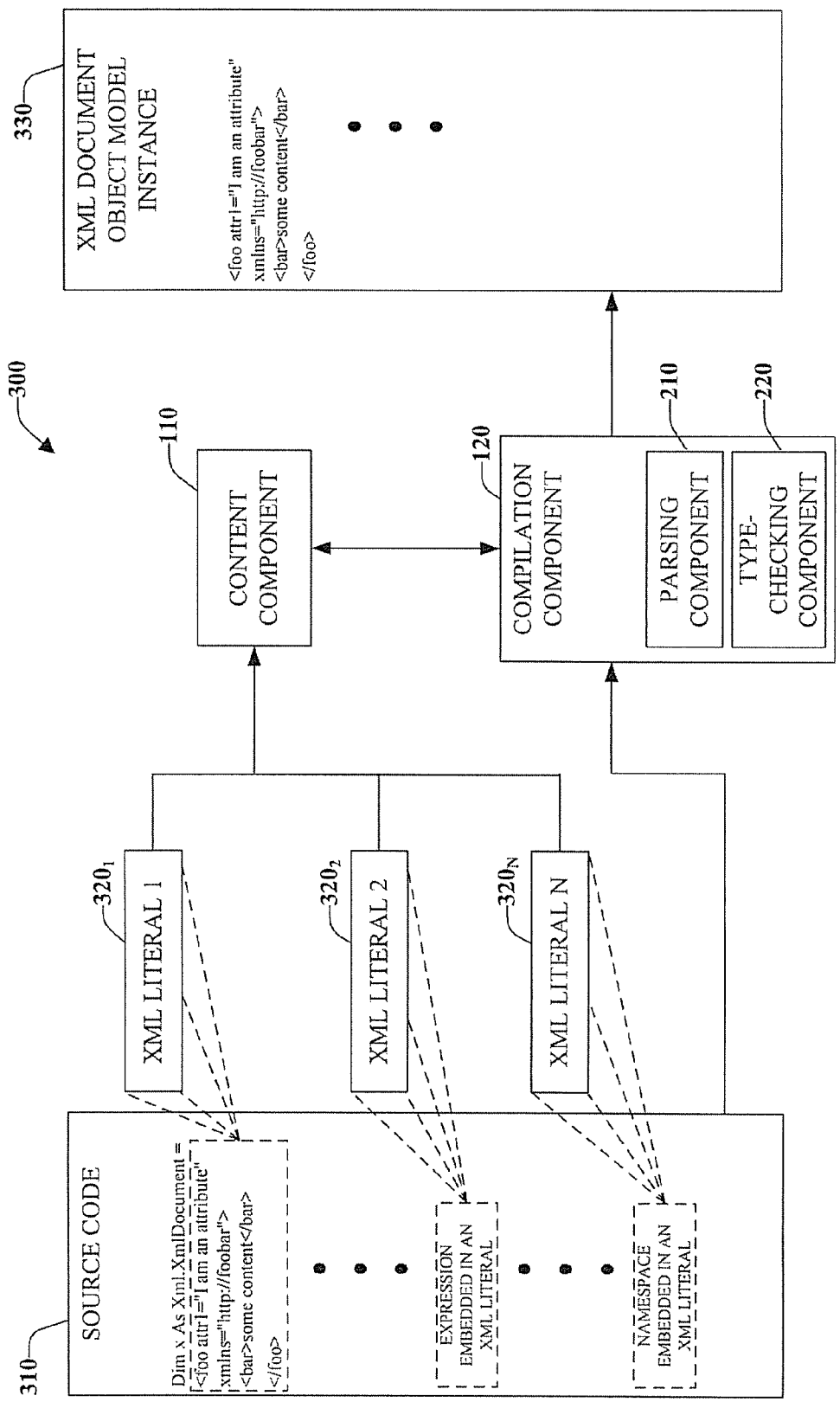
FIG. 3 illustrates a block diagram of the compilation system comprising XML literals that include expressions or statement blocks in accordance with an aspect of the invention.

Turning now to FIG. 3, in one aspect, a computer compilation system 300 can include a source code 310 that contains a plurality of XML literals $320_1$-$320_N$, referred to collectively or individually as XML literals 320. It is to be appreciated that although the XML literals 320 can be referred to collectively, hereafter respective XML literals 320 can have unique properties that distinguish each of the XML literals 320. These XML literals 320 can have namespaces, expressions and/or statement blocks embedded therein. It is to be further appreciated that the source code 310 can be code for any programming language that compiles to an XML DOM. The XML literals 320 can be extracted from the source code 310 by the content component 110, where it is then transmitted to the compilation component 120.

The compilation component 120 includes a parsing component 210 and a type-checking component 220. The compilation component 120 receives the source code 310 and the XML literals 320. Subsequently, the compilation component 120 can translate, compile, parse (via the parsing component 210) and/or type-check (via the type-checking component 220) the XML literals 320 and the source code 310, and can then create an XML DOM instance 330. The XML literal 320 can also include dynamically created child elements as depicted below.

```
Dim Books =
Dim AW =
    <Bib>
    <%=
        SELECT
        <Book (Book.@Year)>
        <%= Book.Title %>
        </Book>
        FROM Book in Books
        WHERE Book.Publisher = "AW"
            AND ALSO Book.@year > 1991
    %>
    </Bib>
```

As can be seen, Book.Title in the example, supra, is a dynamically created child element.

In order to inform the components 120-220 that the XML literal 320 is not a normal literal, but instead is embedded with, for instance, an expression or a child element, the XML literal 320 must also contain special markers. These markers can be any symbol, such as an open parenthesis to denote an expression appears in the tag, i.e., "<(", and a percent sign to denote a child element, i.e., "<%", as illustrated in the example above. Accordingly, components 120-220 can be extended to support these markers.

By allowing XML literals 320 to include expressions, statement blocks and namespaces, XML documents or fragments can be computed at run-time whereas traditionally literals are computed at compile-time. Therefore, the XML literals 320 in this aspect of the subject invention can be much more powerful and flexible. For example, when XML concepts such as element name, attribute name, attribute value, the child element and the child element value are all expressions, then the respective values can be generated based upon the application logic (e.g., via user input), rather than being restricted to pre-programmed static values. By way of example, the following code fragment illustrates the power and functionality of embedding dynamic data types within XML literals 320 in accordance with this aspect of the invention.

```
Sub Main( )
    Dim x = <(GetName( )) (GetAttrName( )) = (GetAttrValue( ))>
        <% Dim a as string
            a = GetBarContent( )
            return <bar><%= a %></bar>
        %>
    </>
End Sub
Function GetName( ) as Xml.XmlQualifiedName
    Return New Xml.XmlQualifiedName("foo", "http://foobar")
End Function
Function GetAttrName( ) As Xml.XmlQualifiedName
    Return New Xml.XmlQualifiedName("attr1")
End Function
Function GetAttrValue( ) As String
    Return Console.ReadLine( )
End Function
Function GetBarContent( ) As String
    Return "some content"
End Function
```

It is to be understood that the "x" variable in the example, supra, is inferred as the underlying XML DOM, which, as previously mentioned, can be any DOM. The versatility of this aspect of the subject invention is readily apparent over conventional systems that do not provide support for XML literals 320 within the programming language, let alone the ability to embed expressions, statement blocks and namespaces within the XML literals 320. Additionally, it is to be further appreciated that the expressions, statement blocks and namespaces can be embedded in the XML literals 320 in any syntactic position in which the underlying DOM supports that expression, statement blocks and namespaces. Table I below illustrates an exemplary chart of the syntactical positions that allow dynamically created fragments based on the XClarity-brand DOM. Table I could represent any XML DOM and is not limited to the XClarity-brand DOM. These additional aspects are to be considered within the spirit and scope of the invention.

TABLE I

| Location | Return type | Comment |
| --- | --- | --- |
| Element name | XmlName | An expression or statement block whose type is convertible to XName (or Xml qualified name) |
| Attribute name | XmlName | An expression or statement block whose convertible to XName (or Xml qualified name) |
| Element value | object | An expression or statement block that is convertible to an Xml element, a collection of Xml elements, or to a string or collection of strings. |
| Attribute value | object | An expression or statement block whose type is convertible to string. |
| Attribute list | Attribute or IEnumerable of attributes | An expression or statement block whose type is convertible to an Attribute or collection of attributes. |

Figure 4:
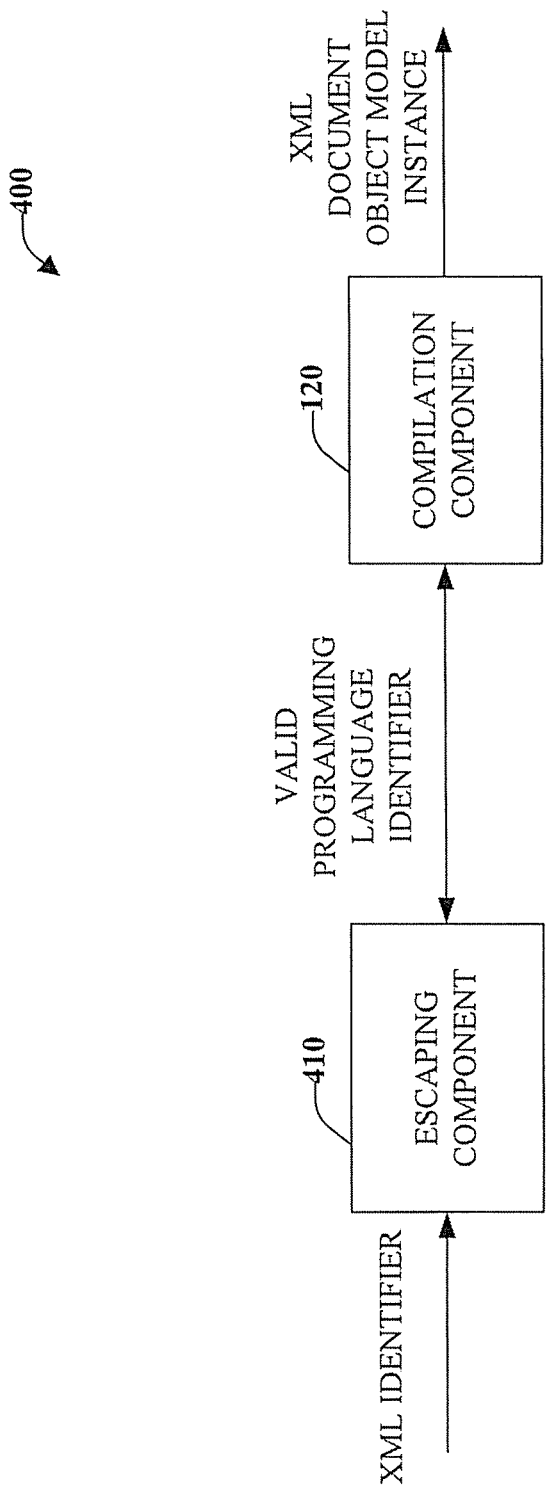
FIG. 4 illustrates an escaping component that escapes an XML identifier and creates a valid programming language identifier in accordance with an aspect of the invention.

With reference now to FIG. 4, a computer compilation system 400 includes an escaping component 410 that receives an XML identifier and escapes the XML identifier to be a valid identifier in the underlying programming language. The system 400 also includes a compilation component 120 that creates an instance of an XML DOM. Adding XML literals to a programming language can imply a need to add XML element and attribute names as valid identifiers into the programming language as well. Additionally, there are valid XML identifiers, such as "Reference-Number" that are not valid identifiers in the underlying language. It is to be appreciated that although an XML identifier is depicted, the escaping component 410 can receive any identifier, even one that is not within the XML domain, thereafter escaping the identifier as a valid identifier in the programming language. For example, this aspect is particularly useful for dynamic languages where objects can represent data from a domain that supports different identifiers escaping than the programming language itself and/or for programming languages that do not natively support XML.

The escaping component 410 can utilize a relational schema that supports any set of characters (including whitespaces, brackets, parenthesis, etc.) as identifiers for column names. In programming languages where the relational schema is mapped to objects, the user can refer to these columns as identifiers of objects that represent the tables. An aspect of the invention enables creating any identifier regardless of the set of characters that was used to create it, in dynamic and statically typed programming languages. The subject invention can extend the limited escaping ability of conventional systems with the ability to escape not only normal keywords, but any character sequence as an identifier delimited by square brackets; and a closing square bracket itself could be escaped by using two closing square brackets. The following is an exemplary implementation of a function that escapes identifiers. It is to be understood that although square brackets are utilized in this example, the escaping component 410 could use other characters or symbols without departing from the spirit and scope of the invention.

```
private static String EncodeName(String inputName)
{
    StringBuilder sb = new StringBuilder(inputName.Length + 6);
    sb.Append('[');
    int iter = 0;
    for (; iter < inputName.Length; iter++)
    {
        if (inputName[iter] == ']')
        {
            sb.Append (']');
            sb.Append (']');
        }
        else
        {
            sb.Append (inputName[iter]);
        }
    }
    sb.Append(']');
    return sb.ToString( );
}
```

Additionally, some programming languages already remove the need for escaping identifiers in certain situations where no ambiguity can occur, e.g., via the IdentifierOrKeyword production.

IdentifierOrKeyword::=Identifier|Keyword

For example in a member access expression X.[Me] there is no ambiguity possible between the identifier Me and the keyword Me, so it is acceptable to write X.Me instead. Accordingly, the extension of the escaping provided by an aspect of the subject compilation system can utilize this relaxation of the escaping rules when no ambiguity can occur to allow richer forms of identifiers to be escaped.

Figure 5:
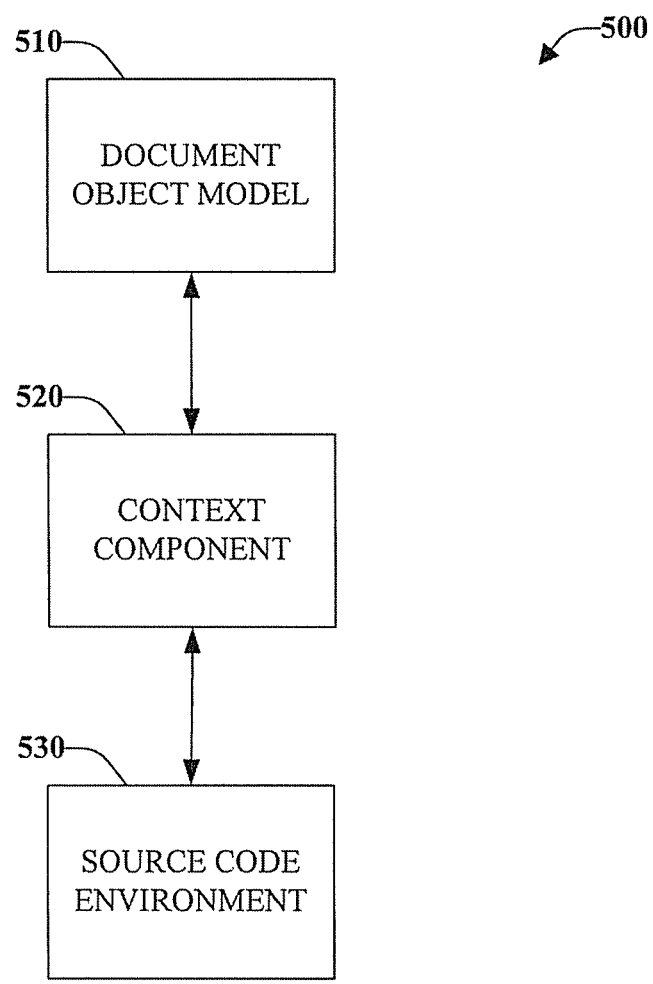
FIG. 5 illustrates a context component that provides context information in accordance with an aspect of the invention.

Referring now to FIG. 5, a computer compilation system 500 is depicted. Generally, the system 500 can include a document object model 510, a context component 520 and a source code environment 530. The context component 520 receives context information (e.g., the position and data types of data elements) from the document object model 510. Subsequently, the context component 520 supplies this information to the source code environment 530. The source code environment 530 can be, for instance, an IDE that provides dynamic context help when the programmer starts to embed an expression in an XML literal. For example, conventionally when a programmer writes an XML literal, the compiler calls an API to translate the XML literal into an expression and then compile it into a new XElement. Accordingly, the programmer, working in the source code environment 530, can be informed exactly what data types can be used in every position of the XML literal the user is programming This context information can be accurately based upon the corresponding document object model 510 that the code will be compiled into an instance of. In essence, the flexibility of the API is "lifted" into the XML literal, and therefore lifted in the programming language that supports XML literals.

Figure 6:
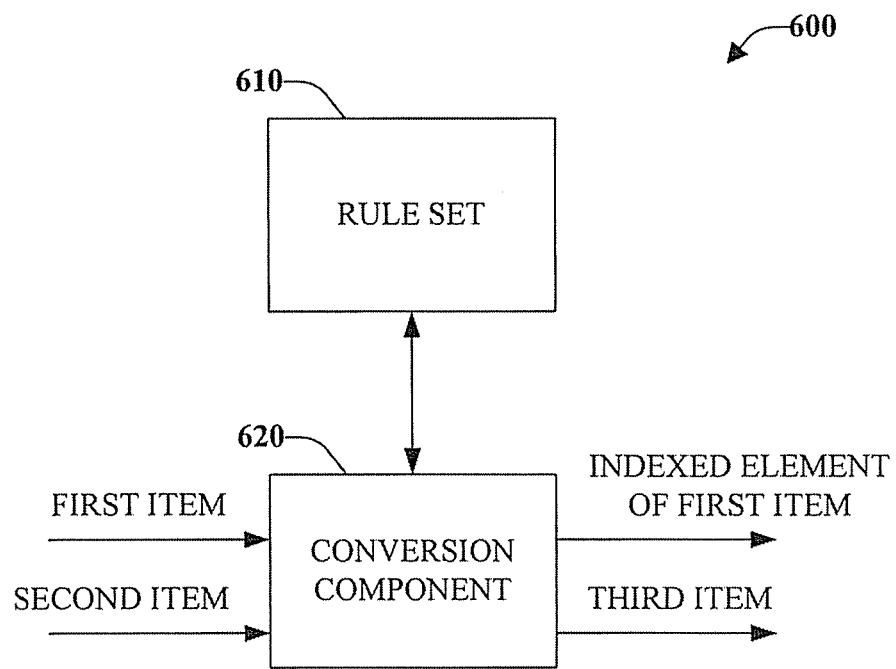
FIG. 6 illustrates a block diagram of a conversion component employs a rule set to convert and index inputs in accordance with an aspect of the invention.

Turning to FIG. 6, a computer compilation system 600 generally includes a rule set 610 and a conversion component 620 that invokes the rule set 610 to perform conversion operations on collection and singleton data types. The conversion component 620 can receive a first item that is a collection data type (e.g., a typed or untyped IEnumerator, or a typed or untyped IEnumerable). The conversion component 620 can index the collection by adding a default extension "item" property to the collection, thereafter outputting an indexed element of the first item. Since the first item data types cannot actually be extended the compiler (e.g., the compilation component 120) can provide the illusion at compile-time that this is the case based on the item property. This aspect allows random access to all the members of the collection whereas conventional methods only provide sequential access to the members. Therefore, in accordance with this aspect, the conversion component 620 can immediately return a member of the collection that is not the first member of the collection.

In addition, using conventional means, there is no easy way to embed a single value of type T into either a typed or untyped IEnumerable, or an IEnumerator collection. This is inconvenient when using an expression that returns a singleton where a collection is required. Conversely, oftentimes an expression returns a typed or untyped IEnumerable or IEnumerator collection, but there is no easy way to coerce that into a single value. Both situations often occur in data-centric programming In order to deal with these situations, according to an aspect of the invention, the conversion component 620 can provide type conversions, analogous to those between String and Integer types. The conversion component 620 can invoke a narrowing rule from the rule set 610 to convert an IEnumerable(OfT) or an IEnumerator(OfT) into type T, or to convert from IEnumerator or IEnumerable into Object. The schemes employed in FIGS. 6-8 may use the System.Query.Sequence namespace depicted below.

| | |
|---|---|
| System.Query.Sequence.Element(E) | REM abbreviated to SQS.Elt(E) |
| System.Query.Sequence.Create(E) | REM abbreviated to SQS.Create(E) |
| System.Query.Sequence.ElementAt(E, Index) | REM abbreviated to SQS.At(E, I) |

The schema, infra, is an exemplary set of typing rules to implement the rule set 610 (FIG. 6). It is to be understood that the typing rules that follow represent one aspect and other aspects exist.

| | |
|---|---|
| *** Background Rules *** | |
| E :: T | REM if E has type T |
| ------------------------------- | REM then |
| SQS.Elt (E) :: IEnumerator(Of T) | REM SQS.Elt(E) has |
| | REM type... |
| E :: T | REM if E has type T |
| ------------------------------- | REM then |
| SQS.Create(E) :: IEnumerator(Of T) | REM   SQS.Create(E) |
| | REM has type ... |
| E :: IEnumerator(Of T)   I :: Integer | REM if these two |
| | REM type assertions |
| | REM hold |
| -------------------------------------- | REM then |
| SQS.At(E, I) :: T | REM SQS.At (NE, I) |
| | REM has type T |
| *** The Narrowing Rule *** | |
| E As IEnumerator(Of T) | REM if E has type |
| | REM Enumerator(Of T) |
| ----------------------------- | REM then |
| E As T (implement as SQS.Elt(E) | REM E can be used |
| | REM where type T |
| | REM is expected |
| *** The Widening Rule *** | |
| E As T | REM if E has type T |
| ----------------------------- | REM then |
| E As IEnumerator(Of T) | REM E may be used |
| | REM where IEnum(E) |
| (implement as SQS.Elt(E) | REM is expected |
| *** The Indexed-Expression Rule *** | |
| E As IEnumerator(Of T)   I As Integer | REM if these two |
| | REM type assertions |
| | REM hold |
| --------------------------------------- | REM then |
| E(I) As T | REM E(I) may be |
| | REM used wherever |
| | REM type T |
| Implement as SQS.At(E, I) | REM is expected | narrowing rule converts the second item (which is a collection) into a third item (which is a singleton) and returns the first element, if any, of the source collection. The opposite conversion (i.e., from collections to singletons) can be a narrowing or widening conversion and creates a singleton collection containing the source element.

Figure 7:
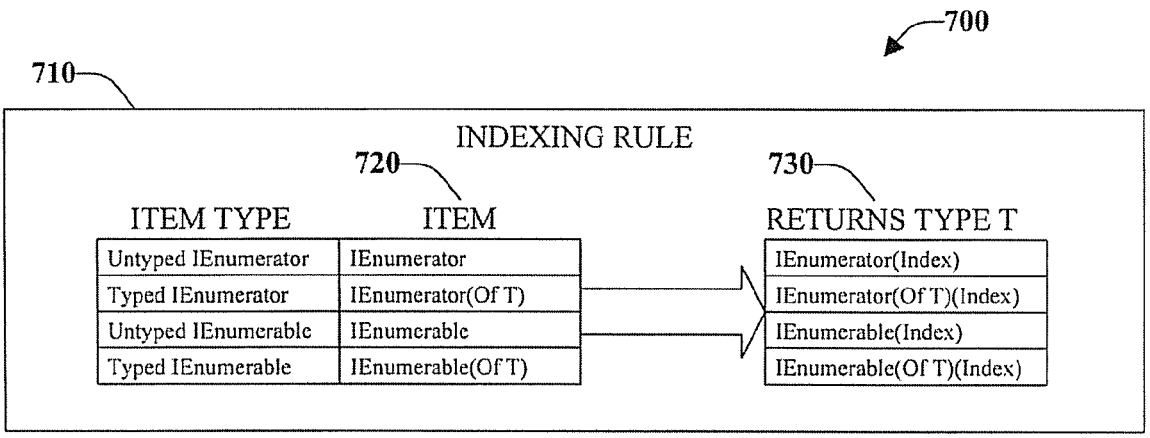
FIG. 7 illustrates a system that employs a reification component that reifies a compile-time declaration to create a run-time value in accordance with an aspect of the invention.
Figure 8:
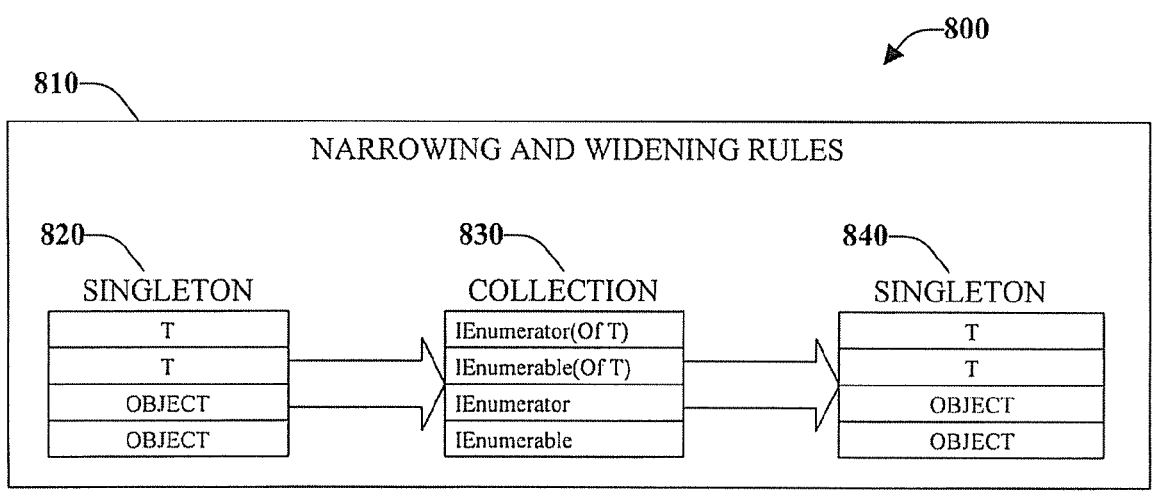
FIG. 8 illustrates an exemplary indexing rule in accordance with an aspect of the invention.

FIG. 7 illustrates a system 700 that includes an indexing rule 710. The system 700 applies the indexing rule 710 when the first item (FIG. 6) is a data type included in the item column 720, and returns a corresponding indexed first item (FIG. 6) included in the returns type T column 730. In FIG. 8 a system 800 that includes narrowing and widening rules 810 is shown. When a singleton is the second item (FIG. 6) the narrowing and widening rules 810 converts to a third item (FIG. 6) which is a collection 830. Similarly, collections 830 can be converted into singletons 840. The conversion The type conversion can be invoked either implicitly, as appropriate, or as the result of explicit type casts such as the following:

| | |
|---|---|
| Dim Ew As IEnumerator(Of T) = CType (E, IEnumerator(Of T)) | REM invoke widening |
| Dim En As T = CType (Ew, T) | REM invoke narrowing |

Figure 9:
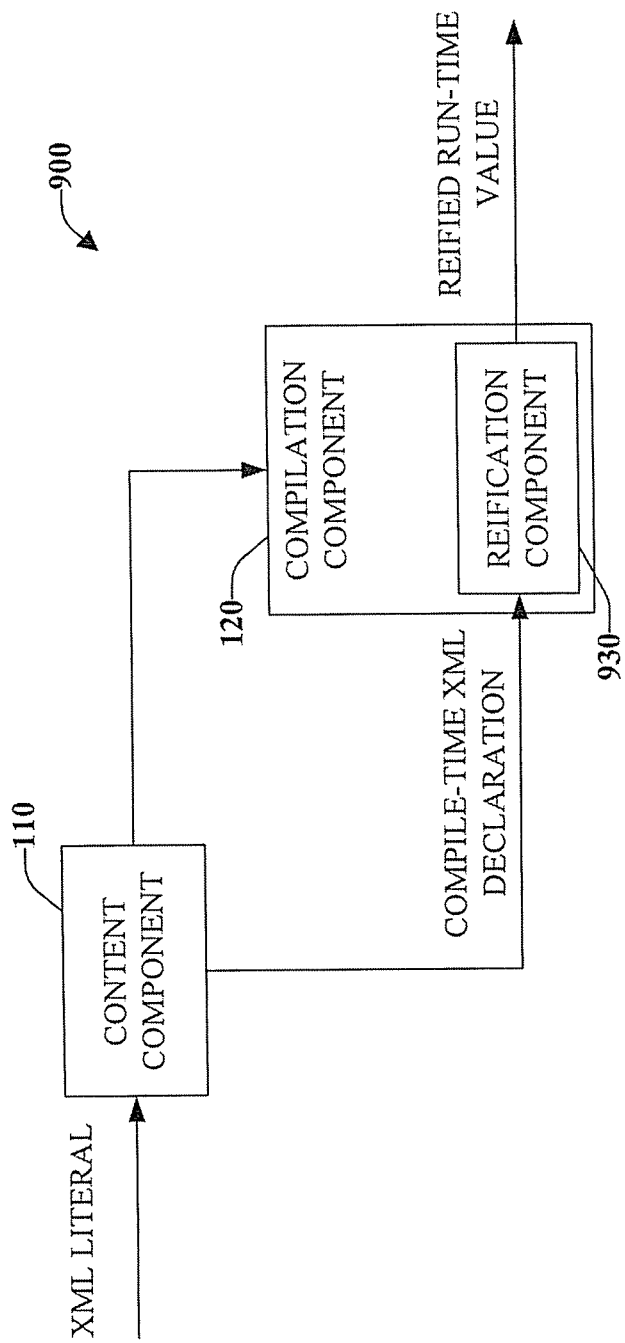
FIG. 9 illustrates exemplary narrowing and widening rules in accordance with an aspect of the invention.

Referring now to FIG. 9, a computer compilation system 900 generally includes a content component 110 that extracts an XML literal, a compilation component 120 that translates the XML literal, and a reification component 930 that reifies a compile-time declaration as a run-time value that a programmer can manipulate.

By extending programming languages to support XML literals that contain XML namespaces, XML namespace declaration can be added to the programming language as well. XML namespaces can be declared via a modified Imports declaration.

```
Imports Namespace "http://foo"
Imports Namespace x="http://bar"
```

Or via an inline namespace declaration in an XML literal.

```
Dim X =
<y:Baz xmlns:y="http://baz" x:bar="Hello"><Foo>World</Foo>
</y:Baz>
```

Namespace declarations are static constructs that are only known to the compiler, just like normal identifiers and types. A compiler (e.g., compilation component 120) can bind a namespace declaration to a value, and many languages allow the reification of certain compiler constructs to become run-time values. For example, using the pseudo-method GetType, the compile-time type Integer can be reified as a run-time value of type System.Type.
Dim T As System.Type=GetType(Integer)

As in one aspect of the subject invention, expressions and statement blocks can be embedded in XML literals wherever the target DOM allows an expression. Subsequently, this aspect can reflect the type of that expression in the type-system that governs the typing of XML expressions that have embedded expressions or statement blocks in those syntactic positions. In a similar manner, another aspect of the invention allows the reification of any compile-time concept for which there is a corresponding run-time representation available. For example, one way to reify a namespace is via an exemplary function, GetNamespace( ) as depicted below.

```
Dim y as String = GetNamespace( )
→ returns default namespace in scope "http://foo"
Dim x as String = GetNamespace(x)
→ returns namespace bound to prefix x, in this case "http://bar"
```

However, in accordance with the subject compilation system, reification is not limited to types and namespaces only. Since reification provides a general mechanism to examine the symbol table of the compiler, the compilation component 120 can reify any concept for which there is a corresponding run-time representation. For example, aspects can reify assemblies, methods or the like.

Figure 10:
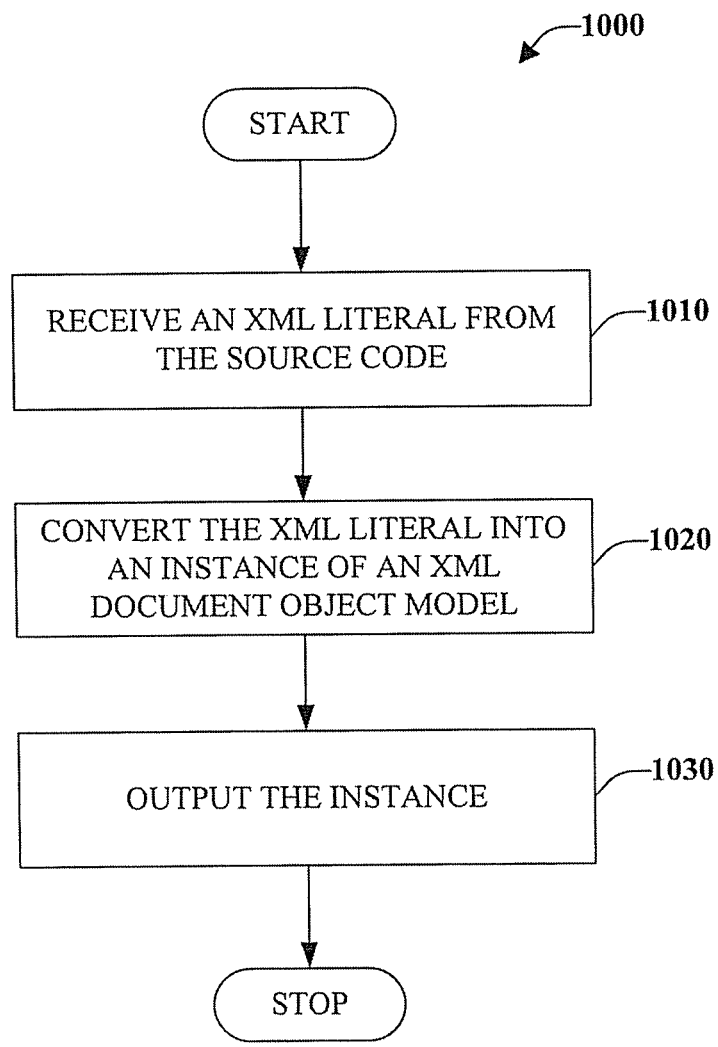
FIG. 10 illustrates an exemplary flow chart of procedures that facilitate receiving an XML literal and creating an instance of an XML DOM in accordance with an aspect of the invention.

FIG. 10 illustrates a process flow diagram of a methodology 1000 for compiling computer language source code into an instance of an XML DOM. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 1010 an XML literal is received from the programming language source code. At 1020 the method converts the XML literal into an instance of an XML DOM that includes the XML literal. At 1030 the instance of the XML DOM is output. As described, supra, such a methodology provides a convenient short cut. Instead of creating this DOM instance through explicit construction, the same instance can be created by simply writing an XML literal directly in the source code as it would appear in the instance of the DOM.

Figure 11:
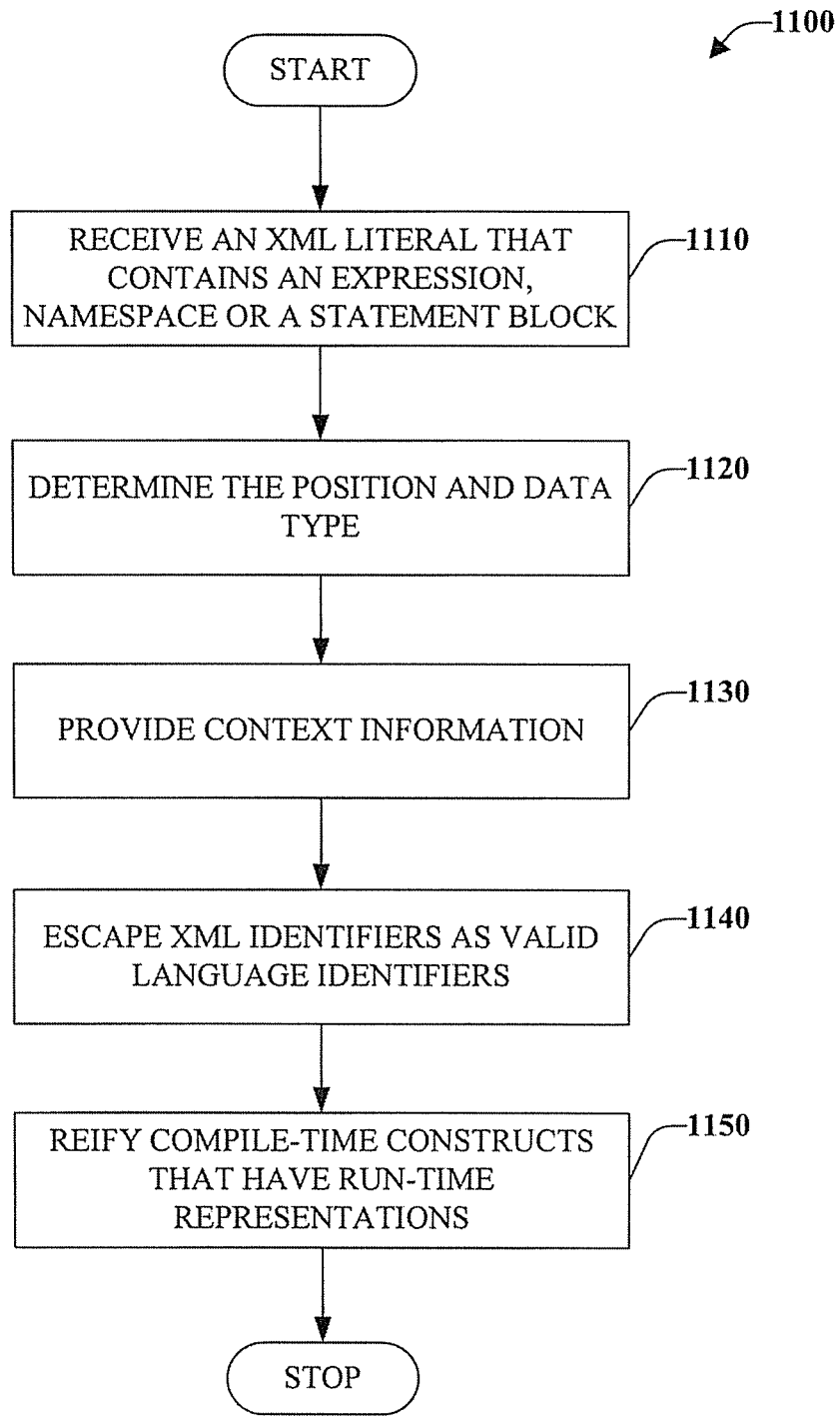
FIG. 11 illustrates an exemplary flow chart of procedures that facilitate receiving an XML literal that includes an expression or a statement block, providing context information, escaping identifiers, and reifying constructs in accordance with an aspect of the invention.

Referring now to FIG. 11, a process flow diagram of a methodology 1100 for compiling computer language source code into an instance of an XML DOM is illustrated. At 1110 the method 1100 receives an XML literal that contains an expression, a statement block and/or a namespace. As previously detailed, by allowing XML literals to include expressions, statement blocks and namespaces, XML documents or fragments can be computed at run-time whereas traditionally literals are computed at compile-time. Therefore, the XML literals can provide for much richer and more versatile content. For example, when XML concepts such as element name, attribute name, attribute value, the child element and the child element value are all expressions, then the respective values can be generated based upon the application logic (e.g., via user input), rather than being restricted to pre-programmed static values.

At 1120 the allowable positions and data types are determined based upon the DOM. As the XML literal is written, the context information including the positions and data types allowed by the DOM can be lifted into the XML literal. At 1130 this context information is provided to the programmer, via, for example conventional methodologies employed by an IDE.

At 1140 XML identifiers are escaped to become valid programming language identifiers. As described, supra, escaping identifiers can employ a relational schema that supports any set of characters (including whitespaces, brackets, parenthesis, etc.) as identifiers for column names. In programming languages where the relational schema is mapped to objects, the user can refer to these columns as identifiers of objects that represent the tables. This methodology enables creating any identifier regardless of the set of characters that was used to create it, in dynamic and statically typed programming languages. Hence, the subject invention can extend the limited escaping ability of conventional programming languages to escape not only normal keywords, but any character sequence as an identifier. If the escaping symbol itself needs to be escaped, then two escaping symbols are used.

At 1150, the methodology 1100 can reify compile-time constructs that have run-time representations. Conventional compilers can bind a declaration (e.g., a namespace declaration) to a value. Often, these declarations are static constructs that are only known to the compiler. However, reification provides a general mechanism to examine the symbol table of the compiler. Therefore, any concept for which there is a corresponding run-time representation can be reified.

Figure 12:
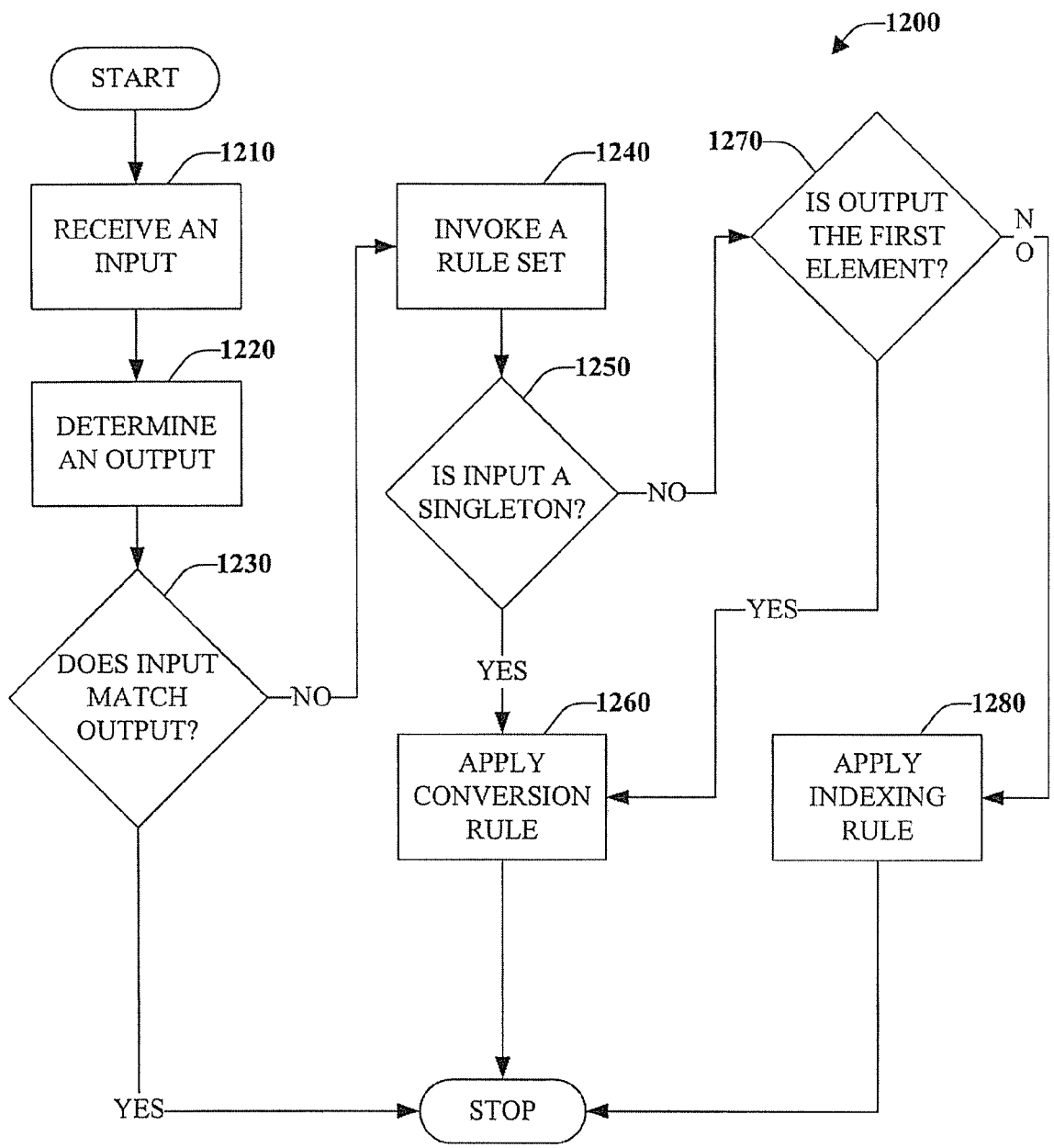
FIG. 12 illustrates an exemplary flow chart of procedures that facilitate determining which conversion rule to apply in accordance with an aspect of the invention.

FIG. 12 illustrates a process flow diagram of a computer-implemented indexing and converting methodology 1200. As detailed above, the method 1200 can receive a collection data type and index the collection in order to return a singleton that is not the first element of the collection; or apply conversion rules in order to convert a singleton into a collection or convert a collection into a singleton. In conventional methods, there is no easy way to embed a single value of type T into either a typed or untyped IEnumerable, or an IEnumerator collection. As described, this is inconvenient when using an expression that returns a singleton where a collection is required. Conversely, oftentimes an expression returns a typed or untyped IEnumerable or IEnumerator collection, but there is no easy way to coerce that into a single value. Both situations often occur in data-centric programming. The methodology 1200 can alleviate this scenario.

At 1210 an input that is an expression or a statement block is received. The method 1200 then proceeds to 1220 where an output based upon an XML DOM is determined. In order to utilize the full capability of XML literals embedded with dynamic content, the XML literal can be populated with any data type that the underlying DOM allows. In accordance with other aspects of the invention, such context information can be provided to the programmer via an IDE.

At 1230 it is determined if the data type for the input matches the data type for the required expected output (i.e., the input for the DOM). If it does, then no conversion is necessary and the methodology 1200 ends. If the data types do not match, then the method 1200 proceeds to 1240 where a rule set is invoked to convert the input data type into the output data type. This is accomplished by applying the appropriate rule based upon the disparate data types of the input and the output.

At 1250 it is determined if the input is a singleton. If this is the case, then, at 1260 a conversion rule is applied to convert a singleton into a collection, and the method 1200 ends. As already described, this conversion can be either a narrowing or a widening conversion. For example, an element of type T can be converted into a singleton collection of types IEnumerable(Of T) or IEnumerator(Of T) and an object can be converted into types IEnumerator or IEnumerable. Referring back to 1250, if the input is not a singleton, then it is a collection, and the methodology 1200 proceeds to 1270.

At 1270, it is determined if the output required is the first element of the collection input. If so, then a narrowing conversion rule is applied at 1260. In this case, however, the collection data type is converted into a singleton data type. For instance, IEnumerable(Of T) or IEnumerator(Of T) is converted into an element of type T and IEnumerator or IEnumerable are converted into an Object.

However, if at 1270 it is determined that the output required is not the first element of the collection, an indexing rule at 1280 is applied to index the collection and return the element of the collection that is required for the output, and the methodology 1200 terminates. The collection is indexed by adding a default extension item property to the collection as illustrated, infra.

Dim B As Book
Dim A As Author=B.Author(2)

In the above example, B.Author is a typed collection (e.g., IEnum(Of Author)). The extension item property, in this case with a value of "2" indicates that the return value should be the third author listed in the collection. Since these collection data types cannot actually be extended with the extension, the compiler will provide the illusion at compile-time that this is the case. As can be seen by those skilled in the art, this manner of indexing provides random access to every data element within the collection whereas convention methods only allow sequential access.

Figure 13:
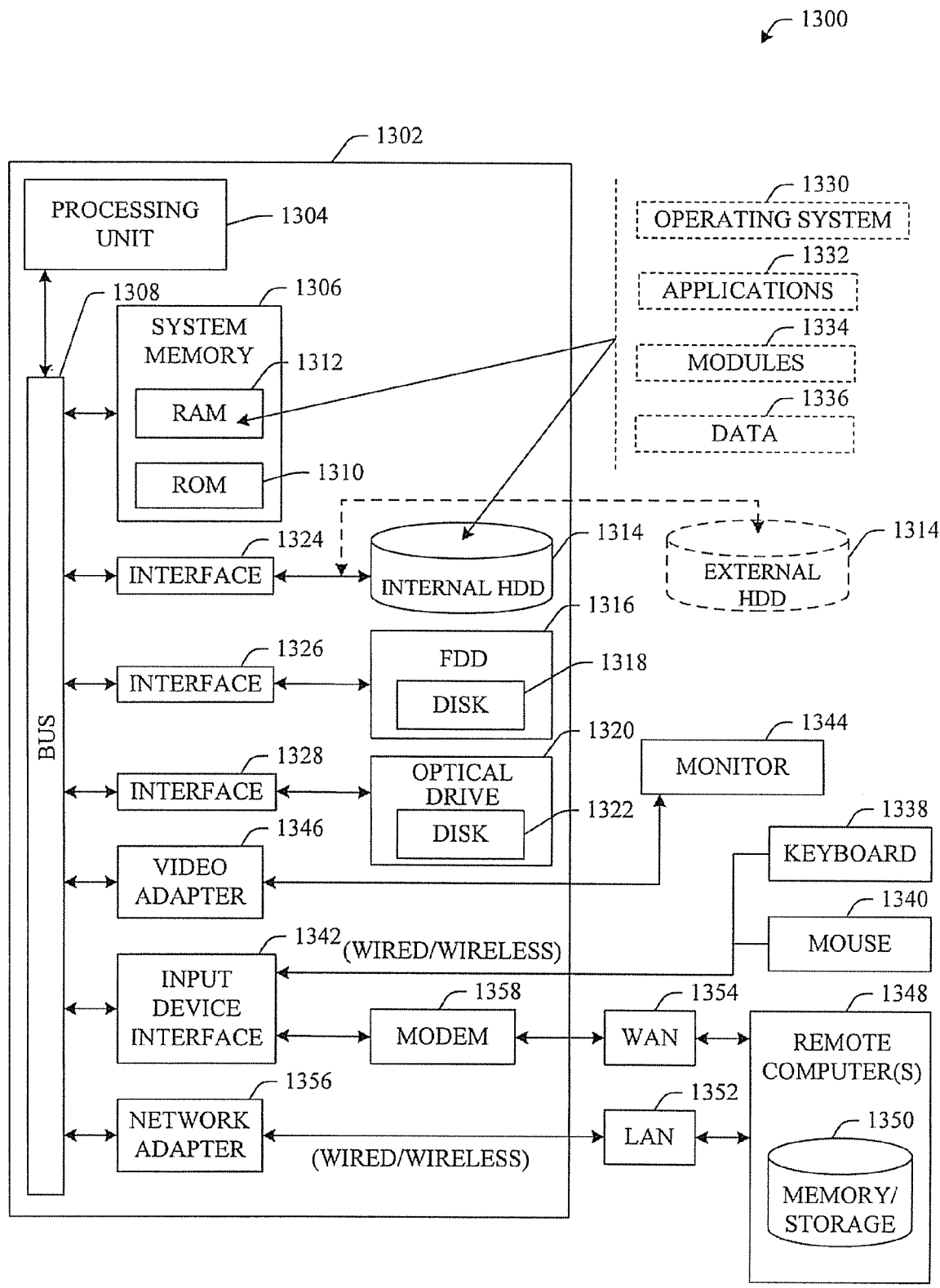
FIG. 13 illustrates a block diagram of a computer operable to execute the disclosed architecture.

Referring now to FIG. 13, there is illustrated a block diagram of an exemplary computer compilation system operable to execute the disclosed architecture. In order to provide additional context for various aspects of the subject invention, FIG. 13 and the following discussion are intended to provide a brief, general description of a suitable computing environment 1300 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the exemplary environment 1300 for implementing various aspects of the invention includes a computer 1302, the computer 1302 including a processing unit 1304, a system memory 1306 and a system bus 1308. The system bus 1308 couples to system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the invention can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 14:
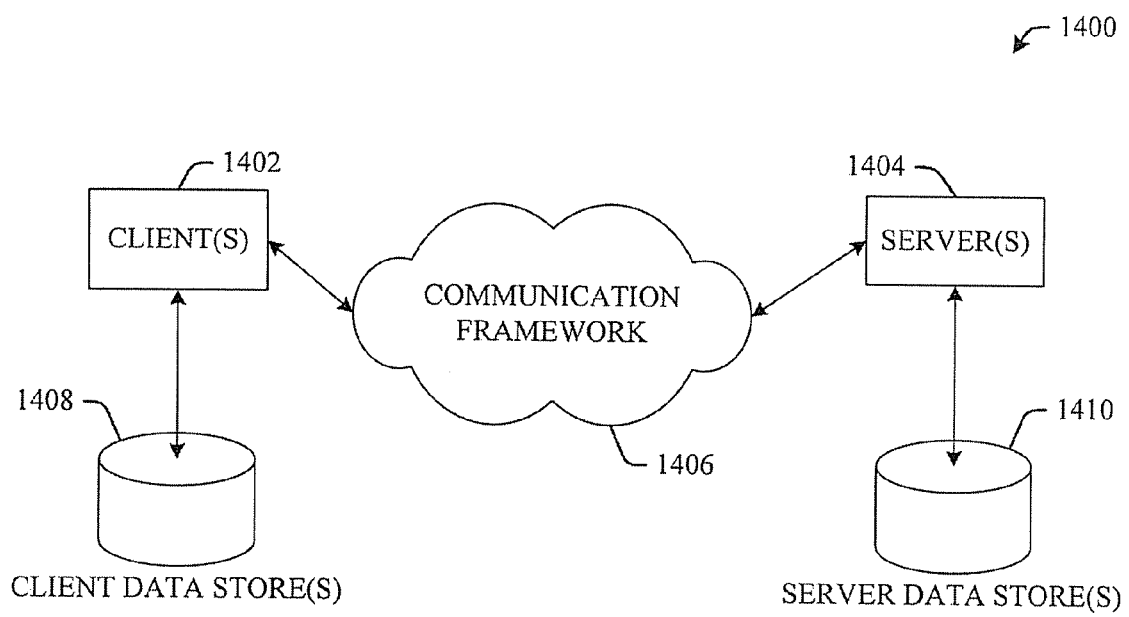
FIG. 14 illustrates a schematic block diagram of an exemplary computing environment in accordance with the subject invention.

Referring now to FIG. 14, there is illustrated a schematic block diagram of an exemplary computer compilation system operable to execute the disclosed architecture. The system 1400 includes one or more client(s) 1402. The client(s) 1402 can be hardware and/or software (e.g., threads, processes, computing devices). The client(s) 1402 can house cookie(s) and/or associated contextual information by employing the invention, for example.

The system 1400 also includes one or more server(s) 1404. The server(s) 1404 can also be hardware and/or software (e.g., threads, processes, computing devices). The servers 1404 can house threads to perform transformations by employing the invention, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. In a computing system using a conventional programming language to create instances of a document object model (DOM), a method for simplifying explicit construction of the DOM, the method comprising:
   accessing a coded program, wherein the coded program is written primarily in a non-markup language code, and wherein at least one XML literal is written directly in the non-markup language code in lieu of explicit instructions;
   after accessing the coded program with the XML literal written directly in the non-markup language code, extracting the at least one XML literal from the non-markup language code of the coded program;
   translating the at least one XML literal previously extracted from the non-markup language code of the coded program; and
   executing the coded program that includes the at least one XML literal to create an instance of an XML DOM, wherein creating the XML DOM includes embedding the XML literal as included within the coded program in the non-markup language code in lieu of executing corresponding instructions in the non-markup language.

2. The method of claim 1, wherein the at least one XML literal includes content that facilitates dynamically creating at least one of a child element, an element name, a prefix for the element name, a local name for the element name, an attribute name, a prefix for the attribute name, a local name for the attribute name, an attribute collection, an attribute value, a namespace uniform resource identifier (URI), a namespace name, or a namespace prefix.

3. The method of claim 2, wherein the content is embedded in an expression or a statement block, wherein the embedded expression or statement block within the at least one XML literal is non-static within a static structure of the at least one XML literal.

4. The method of claim 3, further comprising determining at least one of a valid position or a valid data type for the at least one XML literal, wherein the at least one of the valid position or the valid data type is compatible with the XML DOM.

5. The method of claim 3, further comprising escaping a domain-specific identifier to create a valid identifier for the computer language.

6. The method of claim 3, further comprising reifying a compile-time declaration as a dynamic run-time value.

7. The method of claim 6, the compile-time declaration is at least one of a namespace, a method, or an assembly.

8. An apparatus for use in a computing system using a conventional programming language to create instances of a document object model (DOM) and simplify explicit construction of the DOM, comprising:
   one or more computer-readable storage media, and wherein the one or more computer-readable storage media have stored thereon computer-executable instructions that, when executed by one or more processors of a computing system, are configured to cause the computing system to:
   access a coded program, wherein the coded program is written primarily in a non-markup language code, and wherein at least one XML literal is written directly in the non-markup language code in lieu of explicit instructions;
   after accessing the coded program with the XML literal written directly in the non-markup language code, extract the at least one XML literal from the non-markup language code of the coded program;
   translate the at least one XML literal previously extracted from the non-markup language code of the coded program; and
   execute the coded program that includes the at least one XML literal to create an instance of an XML DOM, wherein creating the XML DOM includes embedding the XML literal as included within the coded program in the non-markup language code in lieu of executing corresponding instructions in the non-markup language.

9. The apparatus of claim 8, wherein the at least one XML literal facilitates dynamic creation of at least one of a child element, an element name, a prefix for the element name, a local name for the element name, an attribute name, a prefix for the attribute name, a local name for the attribute name, an attribute collection, an attribute value, a namespace uniform resource identifier (URI), a namespace name, or a namespace prefix.

10. The apparatus of claim 8, wherein the at least one XML literal is a static structure and further comprises at least one of an expression or a statement block that is non-static within the static structure of the at least one XML literal.

11. The apparatus of claim 9, wherein the computer-executable instructions, when executed by one or more processors of a computing system, are further configured to cause the computing system to:
   escape a domain-specific identifier to be a valid identifier of the programming language, wherein escaping the domain-specific identifier is performed in the non-markup language, which non-markup language does not natively support XML.

12. The apparatus of claim 9, wherein the computer-executable instructions, when executed by one or more processors of a computing system, are further configured to cause the computing system to:

specify, within a source code development environment supporting the non-markup language, at least one of a valid position or a valid data type for the at least one XML literal, wherein the at least one of the valid position or the valid data type are compatible with the XML DOM.

13. The apparatus of claim 9, wherein the computer-executable instructions, when executed by one or more processors of a computing system, are further configured to cause the computing system to:

use a reification component that reifies a compile-time XML declaration as a dynamic run-time value.

14. The apparatus of claim 13, wherein the compile-time XML declaration is at least one of a namespace, a method, or an assembly.

15. The apparatus of claim 9, wherein the computer-executable instructions, when executed by one or more processors of a computing system, are further configured to cause the computing system to:

invoke a rule set that indexes a first item or converts a second item into a third item.

16. The apparatus of claim 15, wherein the first item is at least one of a typed "IEnumerable", an untyped "IEnumerable", a typed "IEnumerator" or an untyped "IEnumerator".

17. The apparatus of claim 15, wherein the second item is an object and the third item is at least one of a typed "IEnumerable", an untyped "IEnumerable", a typed "IEnumerator" or an untyped "IEnumerator".

18. The apparatus of claim 15, wherein the second item at least one of a typed "IEnumerable", an untyped "IEnumerable", a typed "IEnumerator" or an untyped "IEnumerator", and the third item is a singleton.

19. In a computing system using a conventional programming language to create instances of a document object model (DOM), a method for simplifying explicit construction of the DOM, the method comprising:

accessing a coded program, wherein the coded program is written primarily in a non-markup language code lacking native support for XML, and wherein at least one XML literal is written directly in the non-markup language code in lieu of explicit instructions;

after accessing the coded program with the XML literal written directly in the non-markup language code, extracting the at least one XML literal from the non-markup language code of the coded program;

translating the at least one XML literal previously extracted from the non-markup language code of the coded program;

executing the coded program that includes the at least one XML literal to create an instance of an XML DOM, wherein creating the XML DOM includes embedding the XML literal as included within the coded program in the non-markup language code in lieu of executing corresponding instructions in the non-markup language; and invoking a rule set that converts a first item to a second item, wherein the first item is an untyped "IEnumerator" and the second item is a singleton.

20. The method of claim 19, wherein the extracted at least one XML literal has a static structure that includes a non-static expression within the static structure.

\* \* \* \* \*